United States Patent [19]
DeBoalt

[11] Patent Number: 5,361,496
[45] Date of Patent: Nov. 8, 1994

[54] CABLE INSULATION REMOVING TOOL

[76] Inventor: Robert A. DeBoalt, 15 Lake St., Middleton, Mass. 01949

[21] Appl. No.: 25,056

[22] Filed: Mar. 2, 1993

[51] Int. Cl.5 .......................................... H02G 1/12
[52] U.S. Cl. ..................................... 30/90.6; 30/180; 81/9.4
[58] Field of Search ................ 30/90.4, 90.6, 90.8, 30/91.1, 91.2, 92.5, 228, 180; 81/9.4, 9.42, 9.43, 9.41

[56] References Cited

U.S. PATENT DOCUMENTS

| | | | |
|---|---|---|---|
| 3,057,232 | 10/1962 | Cornell, Jr. | 81/9.5 |
| 3,122,036 | 2/1964 | Flower et al. | 81/9.5 |
| 3,563,117 | 2/1971 | Bolssens | 81/9.5 |
| 3,596,541 | 8/1971 | Bieganski | 81/9.43 |
| 3,614,904 | 10/1971 | Young et al. | 81/9.5 R |
| 4,028,800 | 6/1977 | Matthews | 30/90.1 |
| 4,198,748 | 4/1980 | Lewis | 30/180 |
| 4,715,563 | 12/1987 | Quamen | 30/180 |
| 4,741,104 | 5/1988 | Noon | 30/90.4 |
| 5,036,588 | 8/1991 | Cherry | 30/180 |

Primary Examiner—Richard K. Seidel
Assistant Examiner—Hwei-Siu Payer
Attorney, Agent, or Firm—Don Halgren

[57] ABSTRACT

A tool for stripping insulation from a live high voltage power line comprising a pair of relatively movable jaws adapted in a support head attached to the distal end of an non-conducting shaft. The jaws each have C-shaped blades and a longitudinally directed blade for the cutting of the insulation upon the capture of a power line between the jaws.

13 Claims, 6 Drawing Sheets

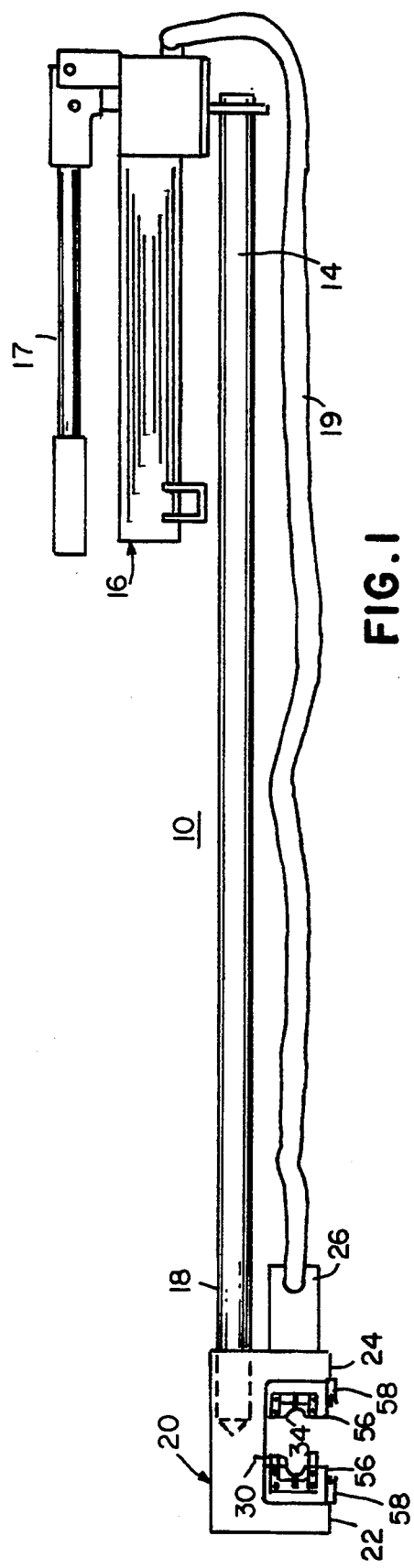
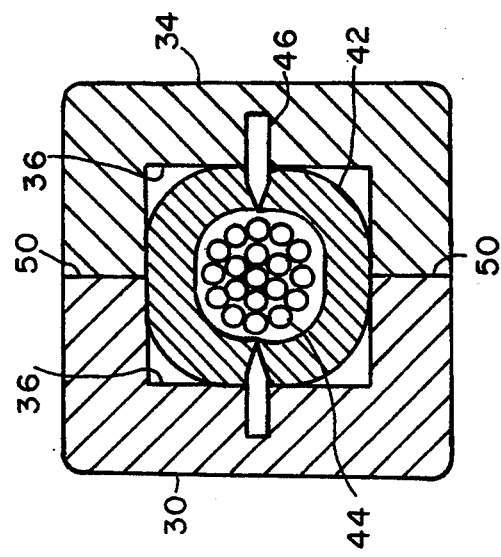
FIG. 1
FIG. 4

CABLE INSULATION REMOVING TOOL

BACKGROUND OF THE INVENTION

(1) Field of the Invention

The present invention relates to tools, and more particularly to tools for removing insulation from high voltage power lines.

(2) Prior Art

Removal of insulation, often quite thick and tenacious, from power lines is common everyday practice for people in the electric power industry.

A common way of removing a portion, say a 4 or 5 inch segment of insulation from a live high voltage power line, is to throw a thin nylon cord over the power line and fully around it once, and pull it back and forth until the insulation is cut through. The cord is then moved to the next location where it is simularly pulled, and then a knife on the end of an insulative pole is utilized to chip-away at the remaining insulation between the cuts. This procedure is done in spite of (or maybe because of) tools available in the trade such as shown in: U.S. Pat. No. 4,028,800 to Matthews, which discloses a complicated motorized, geared, cable shaving tool; U.S. Pat. No. 3,057,232 to Cornell, Jr., which discloses a single spring biased blade for etching away insulation; U.S. Pat. No. 3,614,904, which discloses a spiral cutter for removing the insulation from the end of a wire; U.S. Pat. No. 3,563,117, which discloses a very complicated cam and spring actuated cutting jaws arrangement for removing insulation; U.S. Pat. No. 3,122,036, which discloses a rack and pinion gear arrangement between a pair of articulable handles, which brings a pair of opposed blades into engagement with the wire, the disadvantage being the need for short handles, otherwise the "squeeze together" distance at their proximal end would be too large for someone to work; and, U.S. Pat. No. 4,741,104, which discloses a chevron shaped arrangement of cutting blades adapted to cut optical cable.

It is an object of the present invention to provide a simple tool readily utilizable in the field, by personnel who cut live high voltage power line insulation.

BRIEF SUMMARY OF THE INVENTION

The present invention involves a tool for cutting live high voltage power line insulation with an elongated shaft having an arrangement of cutter blades adapted into a pair of relatively movable, empowered jaws on the distal end thereof.

The elongated pole is non-conductive, having a proximal end which is held by the personnel operating the tool. An empowerment means such as a hydraulic hand pump is arranged on the proximal end of the shaft. The hand pump is connected, via a nonconducting hydraulic connecting hose, to a piston and cylinder unit (hydraulic slave) at the distal end of the shaft.

A "C"-shaped support head, attached at the distal end of the shaft, is defined by a pair of arms, one of which holds the piston and cylinder unit. Each of the arms supports a jaw member. The jaw members are generally alike.

One of the arms of the support head holds its respective jaw fixedly, and the other arm of the support head holds its respective jaw in a movable relationship thereto. The movable jaw is attached to the piston of the piston and cylinder unit attached to the support head.

Each jaw is elongated and is of generally U-shape, in cross-section. A semi-circular radial cutting blade is secured to the end of each elongated jaw, in a transverse manner thereacross. An axial cutting blade is secured into a slot extending the length of the trough of the elongated jaw, and directed away therefrom. Each jaw has an elongated planar surface on each side of the elongated trough. The fixed jaw has an arrangement of alognment pins extending perpendicularly from the ends of the planar surfaces, and the movable jaw has a corresponding arrangement of alignment holes which are adapted to matable receive the alignment pins when the jaws are moved against one another.

In operation of the cable insulation removing tool, the tool is lifted to engage a multiple strand high voltage serial cable between the pins of the fixed jaw so that the cable lies in between the troughs of the two jaws.

The hand pump at the proximal end of the elongated pole is pressurized, to cause pressurized fluid, through the connecting hose, to activate the hydraulic piston and cylinder unit, driving the movable jaw towards the stationary jaw in the support head, capturing the aerial cable fully therebetween, with the transversely directed radial blades and the longitudinally extending axial blade piercing the insulation to a depth just sufficient to permit a full fracture thereof upon movement of the tool. The tool is then pivoted slightly about 15 degrees to fully sever the insulation across the cuts.

The piston and cylinder unit is then depressurized, to retract the movable jaw from the aerial cable insulation, permitting the wire therebetween to be stripped of such insulation.

Each jaw member has a front face, with a pair of sharp edged grooves thereon. If the insulation fails to fall immediately from the multi-stranded aerial cable, the tool may be brought to the insulation again, with the front face of the slightly open jaws pressed thereagainst, to pop it from its multi-stranded core which it surrounds.

A further embodiment of the present invention contemplates an arrangement of toggle linkages which brings one jaw down against a stationary jaw when a threaded shaft extending through the elongated pole, is cranked to effectuate subsequent toggle linkage motion.

The invention comprises a cable insulation removing tool for removing thick insulation from a live high voltage power lines comprising: a pair of opposed jaws arranged on a support head; a single elongated shaft having a proximal and a distal end, the support head being arranged on the distal end of the shaft; an empowerment means actuatably arranged on the proximal end of the elongated shaft; each of the jaws adapted to receive a channel shaped cutter assembly; each cutter assembly having a longitudinally extending, radially directed blade arranged therein; and each cutter assembly having a crescent shaped blade transversely disposed adjacent the ends of the cutter assembly, to create longitudinally opposed cuts and transversely opposed cuts in the insulation of an electric power line placed within the opposed jaws containing the cutter assemblies.

The tool also comprises a pair of troughs which comprise a square configuration when the opposed jaws are empowered together. The jaws have mating alignment means arranged therewith to ensure proper alignment of the blades against any insulated power line disposed therebetween. One of the jaws is fixed with respect to the support head. One of the jaws is movable with respect to the support head. A movement means is arranged on the support head, adjacent to the movable jaw, and in communication with the empowerment means as well as the movable jaw, so as to effectuate movement of the movable jaw with respect to the support head. The movement means includes a hydraulic cylinder which receives pressurized fluid from the empowerment means. The empowerment means comprises a pressurizable piston and cylinder adapted to pressurize the hydraulic cylinder on the support head. The empowerment means may also comprise an explosively chargable driver unit, for actuating the movable jaw. The driver unit has an inner chamber adapted for receipt of a blank shell. The inner chamber has a firing pin therein adapted to be triggered by a release line from the proximal end of the shaft. The driver unit also has a pressure release valve actuatable by a release line at the proximal end of the shaft. The movement means may comprise an arrangement of toggle linkages to pivot the movable jaw into engagement engagement with the fixed jaw. The movement means may also comprise a rotatable handle secured to a threaded shaft, to effectuate motion in the toggle linkages with respect to the support head holding the fixed jaw. Each cutter assembly is replaceably removable from its respective jaw to permit changing the dimension and curve configuration of the blades, to permit the tool to remove insulation of different power line sizes. Each of the jaws has a side face thereon, each of the side faces having a longitudinally directed gripping groove to engage cut insulation and help remove it from a high voltage line.

The method of using the tool comprises the steps of: arranging a pair of relatively movable jaws in a support head on the distal end of an elongated shaft; configuring each of the jaws to have a pair of radially directed, semi-circumferentially disposed blades and a radially directed longitudinally disposed blade therewith; moving the jaws towards one another by an empowerment means on the support head; and effectuating movement by a means on the distal end of the shaft; moving the elongated shaft through an arc of about 15 degrees so as to completely fracture any insulation of a wire between the jaws; pressurizing a cylinder arranged on the support head to effectuate the relative movement of the jaws; providing a master cylinder to supply pressure to a further cylinder arranged on the support head; triggering a blank shell in said cylinder to pressurize a piston therein, to effectuate relative movement of the jaws.

BRIEF DESCRIPTION OF THE DRAWINGS

The objects and advantages of the present invention will become more apparent, when viewed in conjunction with the following drawings, in which;

FIG. 1 is a side elevational view of a cable insulation removing tool constructed according to the principles of the present invention;

FIG. 4 is a transverse view of the jaws fully engaging an aerial cable therebetween;

DESCRIPTION OF THE PREFERRED EMBODIMENTS

Figure 2:
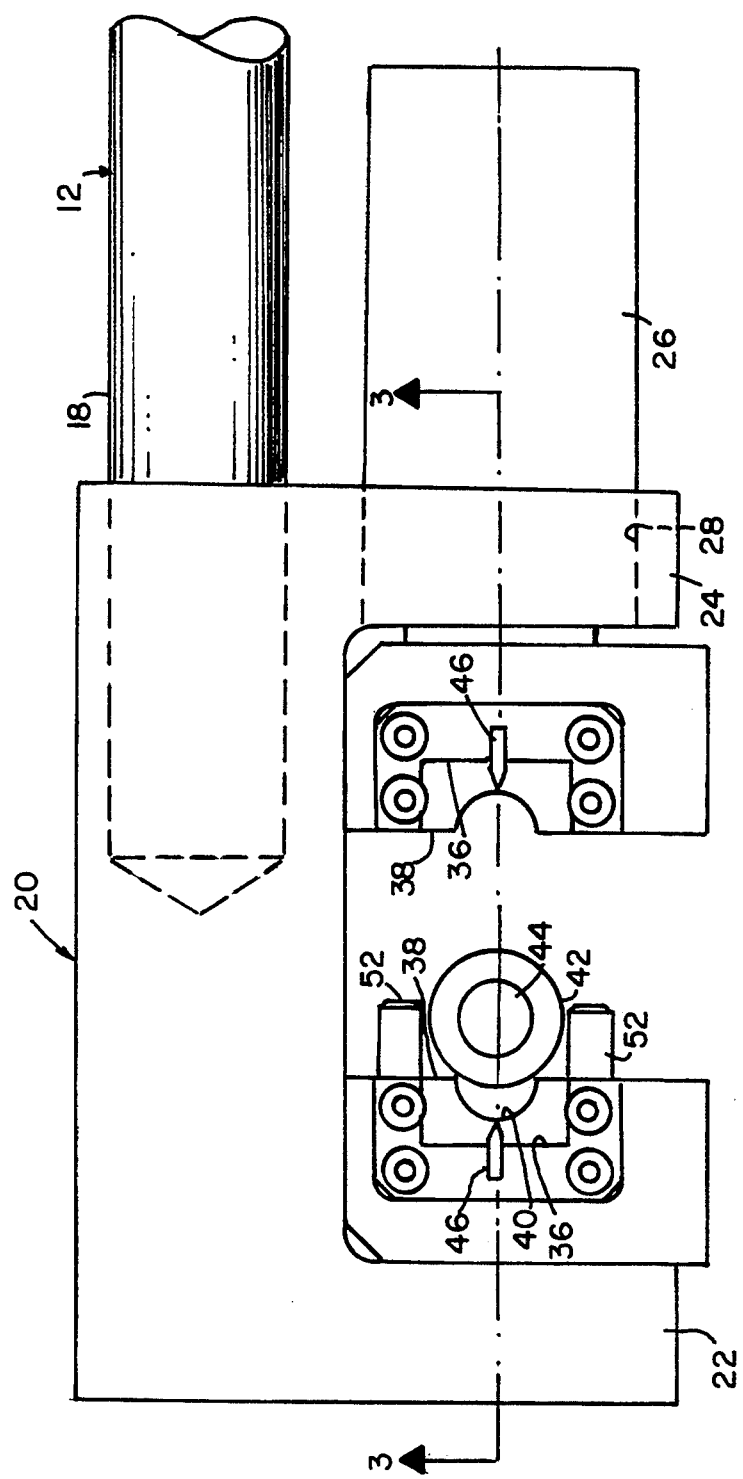
FIG. 2 is a side elevational view of the distal end of the tool showing the ends of the jaws.

Referring now to the drawings in detail; and particularly to FIG. 1, there is shown a high voltage powerline insulation stripping tool 10 having an elongated pole 12 made preferrably of non-conductive material, having a proximal end 14 with a hand-operable hydraulic pump 16 thereattached. The pole 12 has a distal end 18 with a support head 20 fitted thereon. The support head 20 is of generally "C" shaped, defined by an upper arm 22 and a lower arm 24. A piston and cylinder driver unit 26 is arranged through an opening 28 in the lower arm 24 of the support head, 20, as shown in FIG. 2.

The upper arm 22 securedly receives a first jaw 30 which is fixed with respect to the support head 20. The piston and cylinder unit 26, attached to the lower arm 24, has a securement plug 32. The securement plug 32 secures a second jaw 34 to the piston of the piston and cylinder unit 26.

The first and second jaws 30 and 34 are of generally "U"-shape in cross-section, with a longitudinally extending trough 36 therein. Each jaw 30 and 34 has a semi-circular radial cutting blade 38 at the ends of their respective troughs 36, as shown in FIGS. 2 and 3. Each blade has a semi-circular radial cutting blade 38 at the ends of their respective troughs 36, as shown in FIGS. 2 and 3. Each blade as a semi-circular edge 40 sized to pierce the insulation 42 and not the wire core 44 of a power cable.

Figure 3:
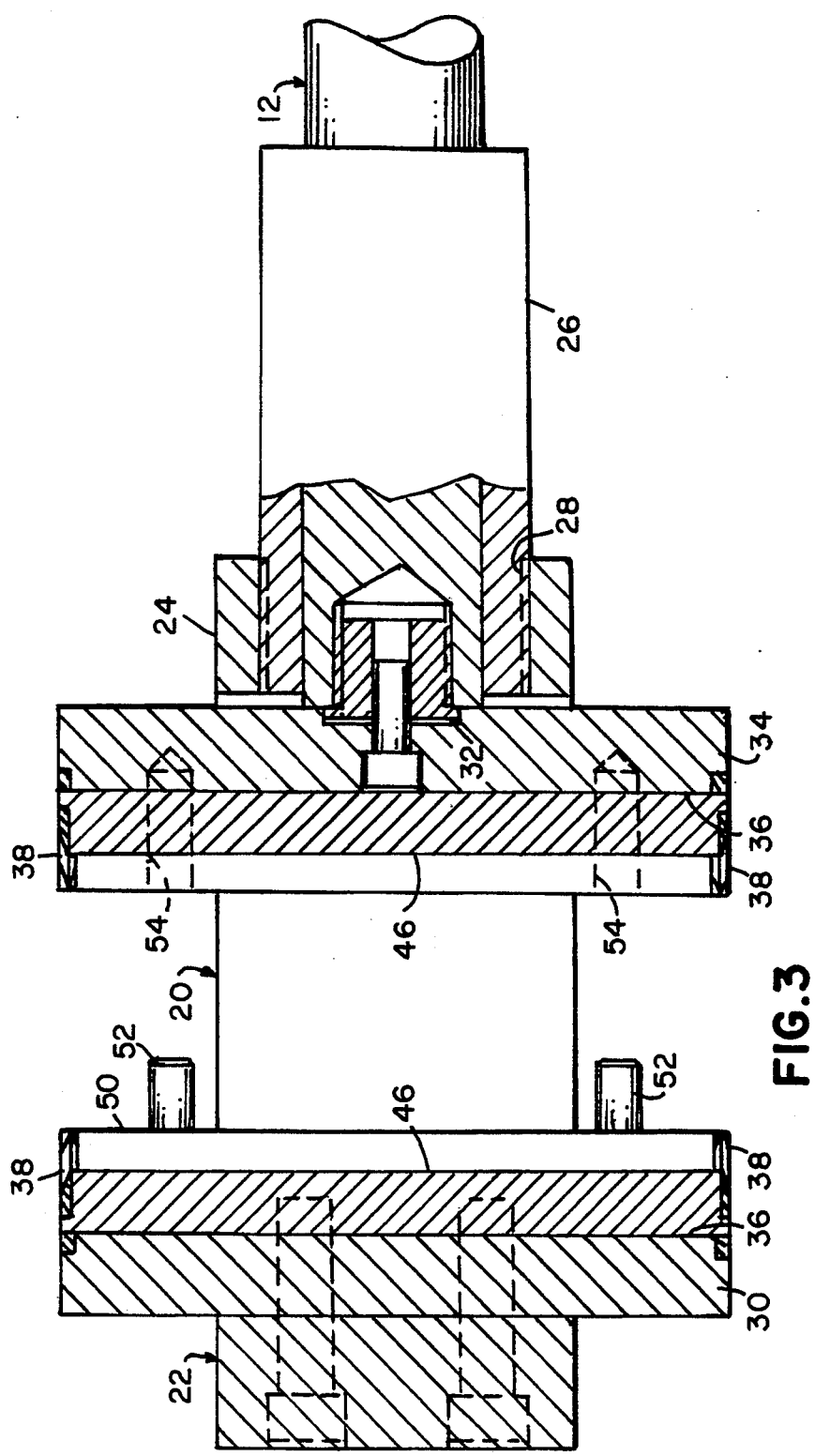
FIG. 3 is a view, taken along the lines III—III of FIG. 2.

Each jaw 30 and 34 has an axial cutting blade 46 secured to and extending the length of each trough 36, in a longitudinally arranged manner therein, as shown in FIGS. 2, 3 and 4.

The first jaw 30 has a pair of planar surfaces 50 extending on each side of its trough 36, as shown in FIGS. 2 and 3. The first (fixed) jaw 30 has a pair of pins 52 at each end of the trough 36, extending perpendicularly from the surfaces 50.

The second jaw 34 has a corresponding arrangement of alignment holes 54 which matingly receive the pins 52 when the jaws 30 and 34 are empowered together.

When the tool 10 is operated, for the removal of insulation from the core of a high voltage wire, the jaws 30 and 34 are manipulated about a high voltage wire 44 with its encased insulation, as shown in FIG. 2. The pins 52 help guide the wire 44 into proper longitudinal alignment with the troughs 36 of each of the jaws 30 and 34.

The handle 17 of the hand pump 16 is moved so as to pressurize fluid therein, through a conduit 19 which is in fluid communication with the piston and cylinder unit 26. Each radial blade 38 and each axial blade 46 pierces the insulation of an aerial cable 42 just to the depth of the core 44.

The cross-sectional view of an aerial cable 42 having its insulation pierced and squeezed somewhat, into the corners of each trough 36 of each jaw 30 and 34, is shown in FIG. 4. The "U"-shaped trough 36 permits slight room for the distorted, pierced insulation to push therein, while keeping the cable properly aligned between the jaws 30 and 34, prior to their separation and removal of the insulation.

If the insulation fails to readily fall off once it has been pierced both transversely and longitudinally by the radial and axial blades 38 and 46 respectively, each jaw 30 and 34 and a front face 56 with an arrangement of sharp edged grooves 58. The front face 56 of each jaw may be pressed against the still-in-place insulation, the jaws closed slightly to squeeze the insulation. Additionally, the elongated pole 12 may be swung back-and-forth slightly, to loosen the insulation, and make it fall off.

Figure 5:
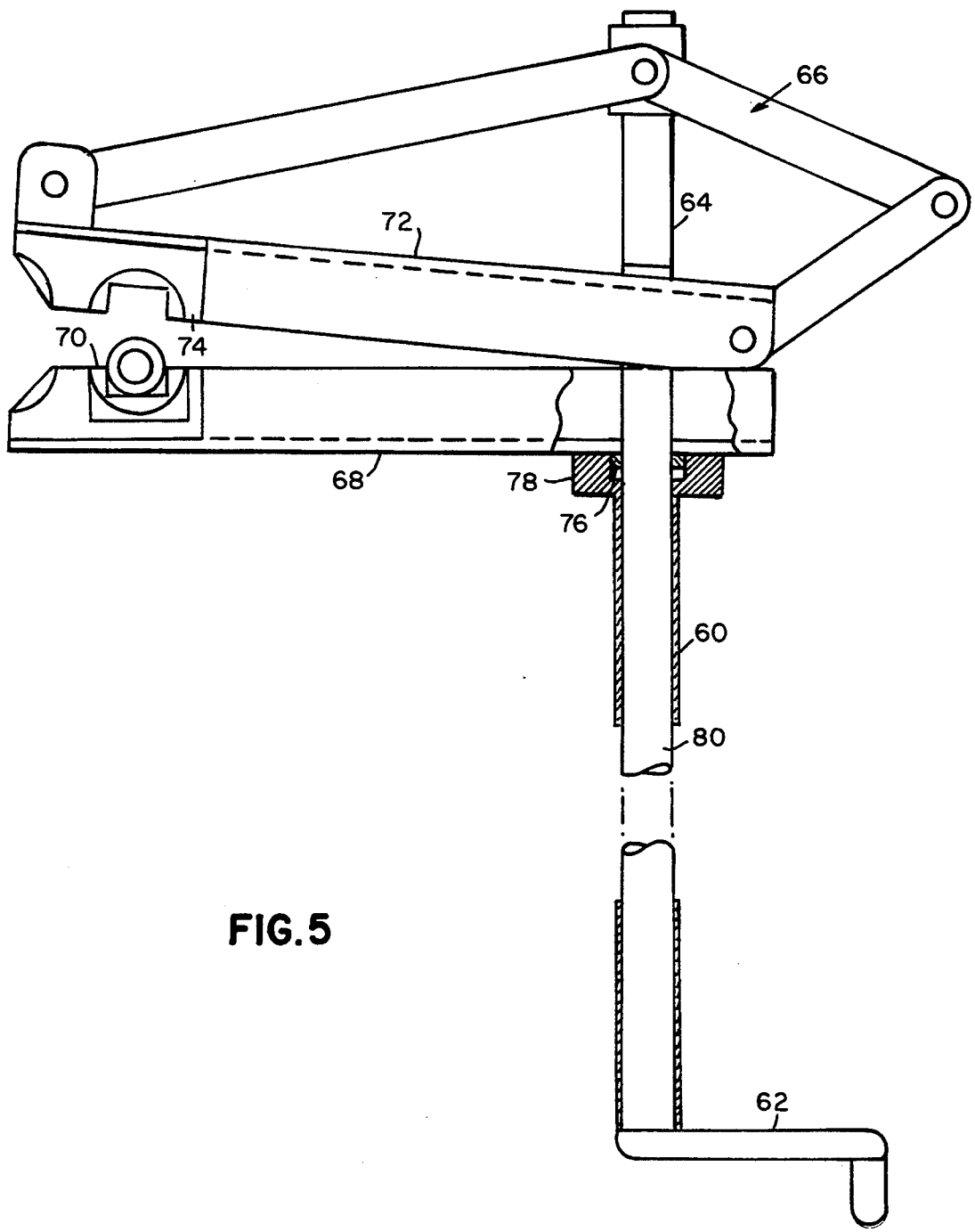
FIG. 5 is a side elevational view of a manual empowerment means of the tool.

A further embodiment of the cable stripping tool is shown in FIG. 5 wherein an elongated hollow pole 60 has a rotatable handle 62 at its proximal and which is part of a threaded shaft 64 engaged to a toggle link arrangement 66 at its distal end. A first arm 68 has a first jaw 70 arranged at its outer end. A toggle arm 72 has a movable jaw 74 arranged at its outermost end, in mating engagement with the first jaw 70, to pierce insulation from a cable in a manner of the aforementioned embodiment. A thrust bearing 76 on a cannula 78 surrounding the inner shaft 80 keeps arm 68 secure when the rotation of shaft 64 pulls the toggle linkage 66 and toggle arm 72 into close engagement with it. The rotatable handle 68 acts as the empowerment means, avoiding the need for fluid pressurization systems.

It is to be noted, that in the hose 19 of the piston and cylinder unit 26 of the earlier embodiment could readily be connected to a pressurized source other than a hand pump unit as shown.

Figure 6:
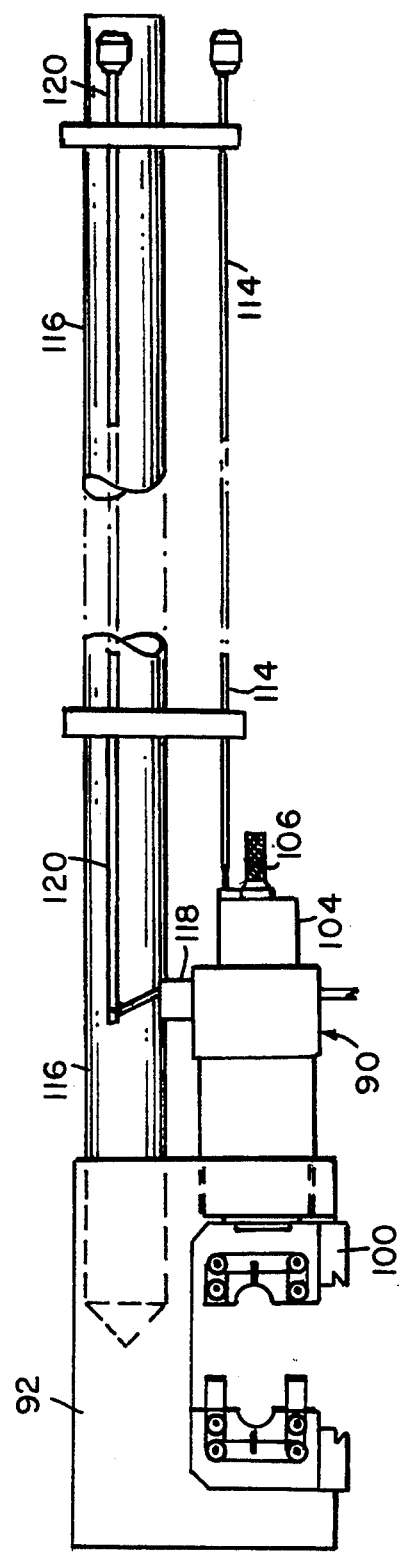
FIG. 6 is a side elevational view of an explosively charged tool empowerment means.
Figure 7:
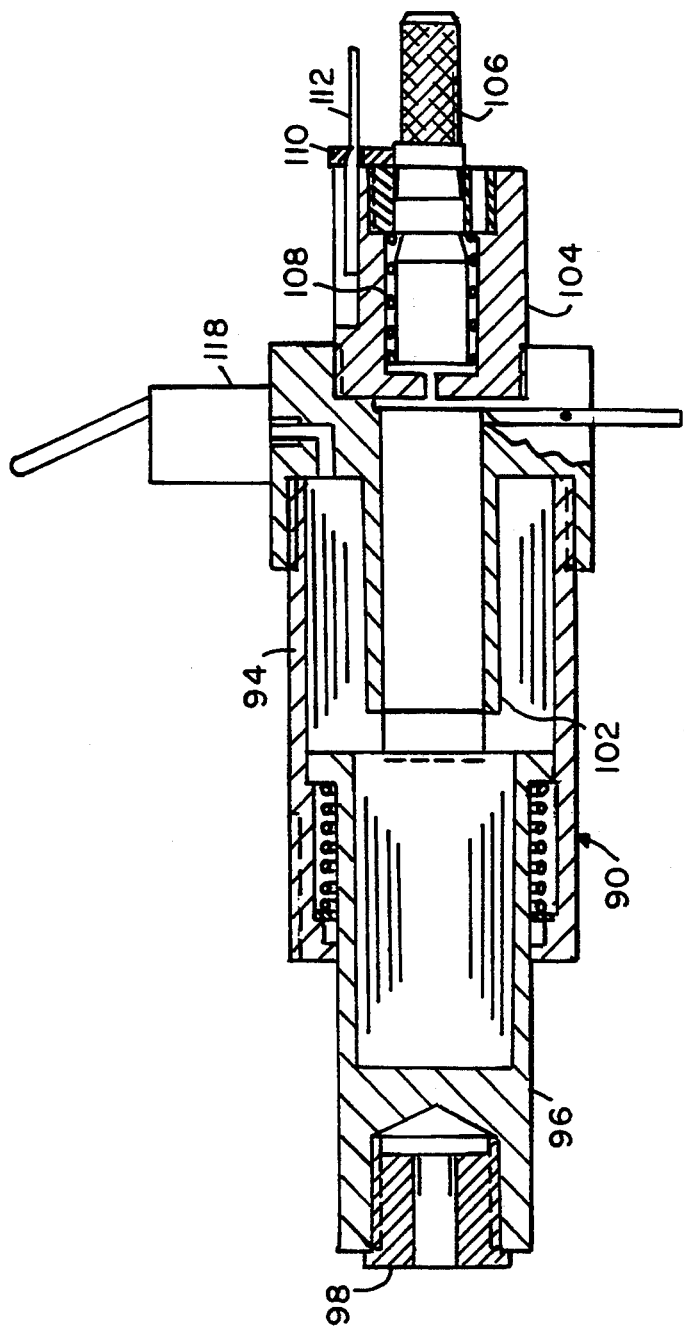
FIG. 7 is an enlarged view of portions of FIG. 6.

A still further embodiment is shown in FIGS. 6 and 7, wherein an explosively chargable driver unit 90 is attached to the support head 92. The explosively chargable driver 90 has an outer cylinder 94 and a proximally biased piston 96. The piston 96 has a distal end with a connecting bolt 98 thereon. The connecting bolt 98 secures the piston 96 to the movable jaw 100, shown in FIG. 6, which is arranged within the support head 92 in a manner similar to the aforementioned embodiments. The piston 96 has an inner chamber 102. The chamber 102 is adapted to receive a blank shotgun shell, not shown. A chamber end 104 is threadedly engaged in the proximal end of the inner chamber 102, and is removable to permit the insertion of the aforementioned blank shotgun shell, not shown. A firing pin 106 is biased within the chamber end 104 by a spring 108. A firing pin catch 110 engages a lip of the pin 106. A catch release pin 112 is slidably received on the chamber end 104 and has a line 114 thereattached, which permits the loaded driver 90 to be discharged from the proximal end of the pole 116, as indicated in FIG. 6. A pressure relief valve 118 has a line 120 by which the piston 96 can be depressorized. Upon the loading of a blank shell in the inner chamber 102, the driver 90 can effectuate rapid movement of the movable jaw 100, upon the triggering of the firing pin 106 by a pulling on the line 114, to effectuate cutting of insulation as in the aforementioned embodiments.

It is therefore submitted, that the present invention provides a unique insulation cutting and removal tool not shown in the art, which tool also permits removal of that insulation from the core wire, if in fact that insulation is not fully severed therefrom.

I claim:

1. A cable insulation removing tool for removing thick insulation from a live high voltage power lines comprising:
   a pair of opposed jaws arranged on a support head;
   a single elongated shaft having a proximal and a distal end, said support head being arranged on the distal end of said shaft;
   an empowerment means actuatably arranged on the proximal end of said elongated shaft;
   each of said jaws adapted to receive a channel shaped cutter assembly;
   each said cutter assembly having a longitudinally extending, radially directed blade arranged therein;
   each said cutter assembly having a crescent shaped blade transversely disposed adjacent each end of said cutter assembly, each of said longitudinally extending blades are arranged to create longitudinally opposed cuts and said crescent shaped blades are arranged to place transversely opposed cuts in the insulation of an electric power line placed within said opposed jaws containing said cutter assemblies;
   each said channel shaped cutter assembly has a trough which comprises a square configuration when said opposed jaws are empowered together;
   one of said jaws being fixed and one of said jaws being movable with respect to said support head; and
   wherein a movement means is arranged on said support head, adjacent to said movable jaw, and in communication with said empowerment means as well as said movable jaw, so as to effectuate movement of said movable jaw with respect to said support head.

2. A cable insulation removing tool as recited in claim 1, wherein each of said jaws has mating alignment means arranged therewith to ensure proper alignment of said blades against any insulated power line disposed therebetween.

3. A cable insulation removing tool as recited in claim 1, wherein said movement means comprises a hydraulic cylinder which receives pressurized fluid from said empowerment means.

4. A cable insulation removing tool as recited in claim 3, wherein said empowerment means comprises a pressurizable piston and cylinder adapted to pressurize said hydraulic cylinder on said support head.

5. A cable insulation removing tool as recited in claim 1, wherein said empowerment means comprises an explosively chargable driver unit, for actuating said movable jaw.

6. A cable insulation removing tool as recited in claim 5, wherein said driver unit has an inner chamber adapted for receipt of a blank shell.

7. A cable insulation removing tool as recited in claim 6, wherein said inner chamber has a firing pin therein adapted to be triggered by a release line from the proximal end of said shaft.

8. A cable insulation removing tool as recited in claim 6, wherein said driver unit has a pressure release valve actuatable by a release line at the proximal end of said shaft.

9. A cable insulation removing tool as recited in claim 1, wherein said movement means comprises an arrangement of toggle linkages to pivot said movable jaw into engagement with said fixed jaw.

10. A cable insulation removing tool as recited in claim 9, wherein said empowerment means comprises a rotatable handle secured to a threaded shaft, to effectuate motion in said toggle linkages with respect to said support head holding said fixed jaw.

11. A cable insulation removing tool as recited in claim 1, wherein each of said cutter assembly has means to be replaceably removable from its respective jaw to permit changing the dimension and curve configuration of said blades, to permit said tool to remove insulation of different power line sizes.

12. A cable insulation removing tool as recited in claim 11, wherein each of said jaws has a front face thereon, each of said front faces having a longitudinally directed gripping groove therewith to engage cut insulation and help remove it from a high voltage line.

13. A cable insulation removing tool as cited in claim 1, wherein one of said jaws has an arrangement of pins and the other of said jaws has an arrangement of openings for receipt of said pins to permit proper alignment of the power line between said jaws during engagement of the power line therebetween.

* * * * *